United States Patent
Sawhney

(10) Patent No.: US 10,191,936 B2
(45) Date of Patent: Jan. 29, 2019

(54) TWO-TIER STORAGE PROTOCOL FOR COMMITTING CHANGES IN A STORAGE SYSTEM

(71) Applicant: Oracle International Corporation, Redwood Shores, CA (US)

(72) Inventor: Aditya Sawhney, Erie, CO (US)

(73) Assignee: Oracle International Corporation, Redwood Shores, CA (US)

( * ) Notice: Subject to any disclaimer, the term of this patent is extended or adjusted under 35 U.S.C. 154(b) by 201 days.

(21) Appl. No.: 15/338,829

(22) Filed: Oct. 31, 2016

(65) Prior Publication Data

US 2018/0121492 A1    May 3, 2018

(51) Int. Cl.
G06F 17/30    (2006.01)

(52) U.S. Cl.
CPC .. G06F 17/30377 (2013.01); G06F 17/30371 (2013.01)

(58) Field of Classification Search
CPC .............. G06F 17/30377; G06F 17/30371
USPC ........................................................ 707/703
See application file for complete search history.

(56) References Cited

U.S. PATENT DOCUMENTS

| | | |
|---|---|---|
| 5,544,347 A | 8/1996 | Yanai et al. |
| 6,108,748 A | 8/2000 | Ofek et al. |
| 6,157,612 A | 12/2000 | Weerackody et al. |
| 6,714,553 B1 | 3/2004 | Poole et al. |
| 7,035,971 B1 | 4/2006 | Merchant |
| 7,263,593 B2 | 8/2007 | Honda et al. |
| 7,707,151 B1 | 4/2010 | Blumenau et al. |
| 8,521,973 B2 | 8/2013 | Rowan et al. |
| 8,973,034 B1 | 3/2015 | Harvey et al. |
| 9,037,538 B2 | 5/2015 | Sampathkumar |
| 9,396,287 B1 | 7/2016 | Bhave et al. |
| 9,501,507 B1 | 11/2016 | Harris et al. |
| 9,507,843 B1 * | 11/2016 | Madhavarapu ... G06F 17/30575 707/703 |
| 9,524,302 B2 | 12/2016 | Regni et al. |
| 9,720,989 B2 | 8/2017 | Theimer et al. |
| 9,864,774 B2 | 1/2018 | Marcotte |
| 2001/0016843 A1 | 8/2001 | Olson et al. |
| 2002/0143494 A1 | 10/2002 | Conrad |
| 2004/0153458 A1 | 8/2004 | Noble et al. |

(Continued)

FOREIGN PATENT DOCUMENTS

KR    10-2015-0088531 A    8/2015

*Primary Examiner* — Shahid A Alam

(74) *Attorney, Agent, or Firm* — Invoke

(57) ABSTRACT

Systems and methods for implementing a two-tier commit protocol are described herein. In one or more embodiments, a storage system is configured to receive a request to store an object within a storage system, the object comprising (a) data and (b) metadata. Responsive to the request, the metadata is transmitted to a metadata tier of the storage system, which generates a first acknowledgment that a metadata record has been created in the metadata tier with a pending status. Responsive to the first acknowledgment, the object data is transmitted to a data tier of the storage system. A second acknowledgment is then generated indicating that a data record has been created with a pending status. Responsive to the second acknowledgement, the metadata record is updated to a committed status. The data record in the data tier is then updated to a committed status.

20 Claims, 7 Drawing Sheets

(56) References Cited

U.S. PATENT DOCUMENTS

| | | |
|---|---|---|
| 2006/0072400 A1 | 4/2006 | Anderson et al. |
| 2006/0218558 A1 | 9/2006 | Torii et al. |
| 2006/0271420 A1 | 11/2006 | Anselmann et al. |
| 2007/0239944 A1 | 10/2007 | Rupanagunta et al. |
| 2010/0205160 A1 | 8/2010 | Kumar et al. |
| 2010/0257995 A1 | 10/2010 | Kamiya |
| 2010/0322475 A1 | 12/2010 | Ikeda |
| 2011/0013631 A1 | 1/2011 | Frydman et al. |
| 2011/0119100 A1 | 5/2011 | Ruhl et al. |
| 2011/0164614 A1 | 7/2011 | Begeja |
| 2011/0196900 A1 | 8/2011 | Drobychev et al. |
| 2011/0246429 A1 | 10/2011 | Prahlad et al. |
| 2012/0072412 A1 | 3/2012 | Bestgen et al. |
| 2012/0254116 A1 | 10/2012 | Thereska et al. |
| 2012/0311586 A1 | 12/2012 | Inagaki |
| 2013/0311555 A1 | 11/2013 | Laoutaris et al. |
| 2014/0122022 A1 | 5/2014 | Chen et al. |
| 2014/0180461 A1 | 6/2014 | Heck et al. |
| 2014/0280986 A1 | 9/2014 | Baulier et al. |
| 2015/0234897 A1 | 8/2015 | Kuninobu et al. |
| 2015/0278092 A1 | 10/2015 | Smentek et al. |
| 2015/0339314 A1 | 11/2015 | Collins et al. |
| 2015/0355824 A1 | 12/2015 | Ueno |
| 2015/0363271 A1* | 12/2015 | Haustein ............ G06F 11/1464 707/682 |
| 2015/0370505 A1 | 12/2015 | Shuma et al. |
| 2016/0006673 A1 | 1/2016 | Thomas et al. |
| 2016/0026409 A1 | 1/2016 | Tanaka et al. |
| 2016/0105370 A1 | 4/2016 | Mellor et al. |
| 2016/0202693 A1 | 7/2016 | Noda et al. |
| 2016/0306822 A1 | 10/2016 | Waghulde |
| 2016/0335550 A1 | 11/2016 | Achin et al. |
| 2016/0342486 A1 | 11/2016 | Kedem et al. |
| 2017/0351543 A1 | 12/2017 | Kimura |
| 2017/0371887 A1 | 12/2017 | Balasubramanian et al. |
| 2018/0075069 A1 | 3/2018 | Guim et al. |

\* cited by examiner

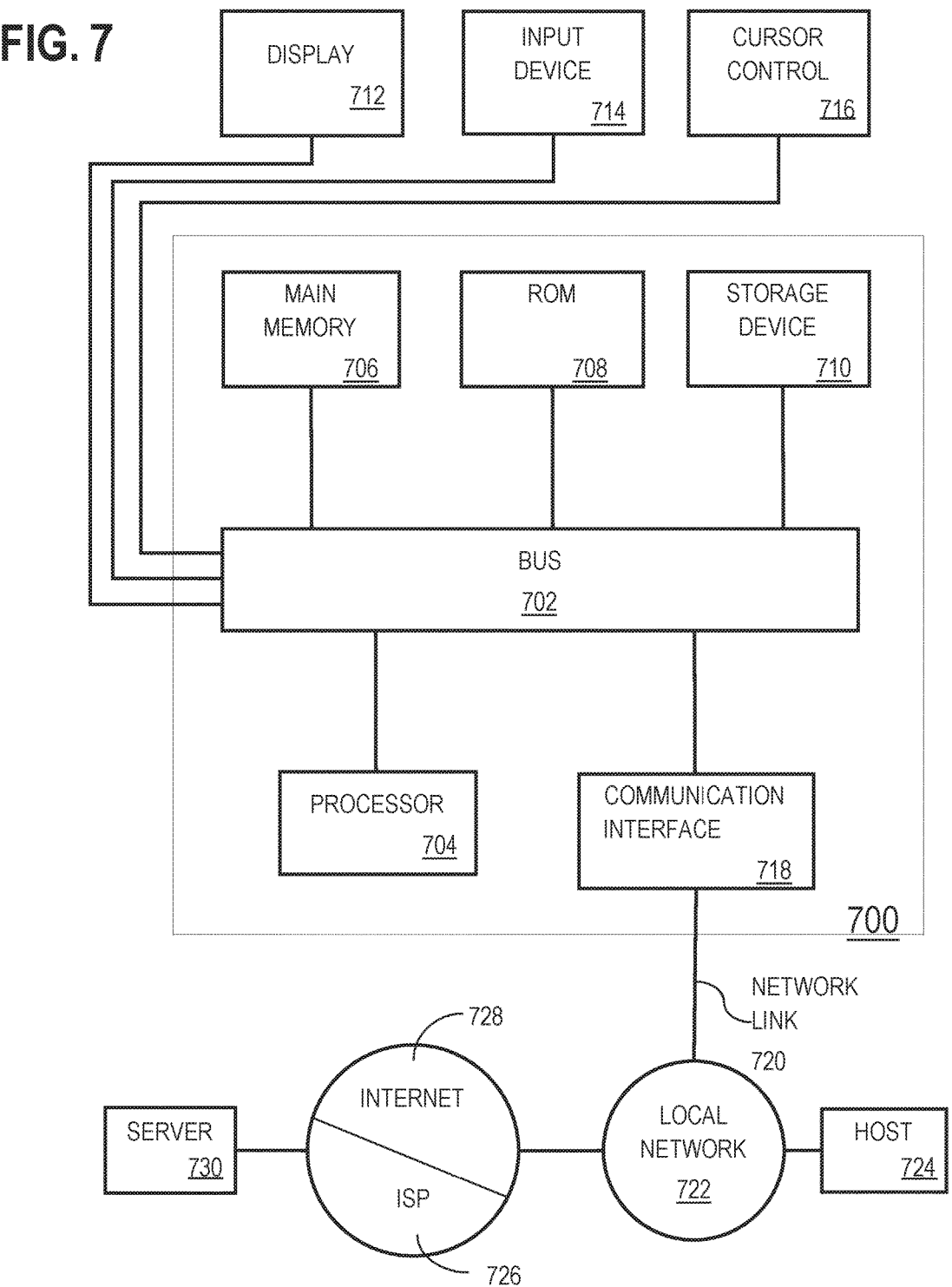

TWO-TIER STORAGE PROTOCOL FOR COMMITTING CHANGES IN A STORAGE SYSTEM

TECHNICAL FIELD

The present disclosure relates to storing objects in a storage system. In particular, the present disclosure relates to managing transactions that modify data within a storage system.

BACKGROUND

Storage systems store objects according to various corresponding storage architectures. Examples of storage architectures include an object storage, a file system, a block storage, and/or a database.

Each object within a storage system is associated with data and metadata. Data (also referred to herein as "object data") includes, for example, information that is used by an end user and/or a client application. As an example, data for a Sales Application may include information about customers, products, and sales. As another example, data for a Human Resources Application may include information about employees, departments, and salaries. Metadata describes how the data is set up and/or stored. Additionally or alternatively, metadata describes characteristics about the data itself. Metadata may be used to manipulate and/or manage the objects in a storage system.

In cloud computing environments, distributed storage systems are often used to store object data for end users and/or client applications. Typically, distributed storage systems replicate data objects across multiple physical storage locations. One benefit of distributed storage systems is data redundancy. If one copy of a data object becomes lost or corrupted, a separate copy of the data object may be retrieved from another node within the distributed storage system. Another benefit of distributed storage systems is that access times to data objects may be decreased. Access requests may originate from multiple storage clients that are geographically dispersed. The distributed storage system may route requests to storage servers based on location, load and/or other factors in an effort to minimize data access times.

Distributed storage system implementations involve several challenges including managing data consistency. Various consistency models have been developed to guarantee that the results of read and write operations will be predictable. Eventual consistency is an example of a consistency model that may be employed in the context of a cloud environment. According to the eventual consistency model, the storage system guarantees that, if no new updates to a data object are made, all reads of the data object will eventually return the last updated version of the object. With eventual consistency, different storage clients may access data objects in different states at a given point in time. For example, an update made by one client of the storage system may not be immediately viewable by another client as it may take time to replicate the change throughout the system.

In contrast to eventual consistency, strong consistency models guarantee that all writes to a data object are seen by all parallel processes in the same order that the writes are performed. In other words, strong consistency ensures that only one consistent state is observed at a given point in time. If a write is committed by one storage client, then the written data is immediately viewable by other storage clients accessing the storage system.

Cloud providers often prefer eventual consistency models to strong consistency models due to the high availability and scalability of eventual consistency models. However, eventual consistency models are prone to returning partial and/or corrupt data since there may be two consistent states at a given point in time. Many applications require strong consistency to guarantee that different nodes within a distributed storage environment are in the same state. As these applications are pushed to cloud environments, the availability and scalability of strong consistency models become increasingly significant.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7 illustrates an example computer system upon which one or more embodiments may be implemented.

DETAILED DESCRIPTION

Figure 1:
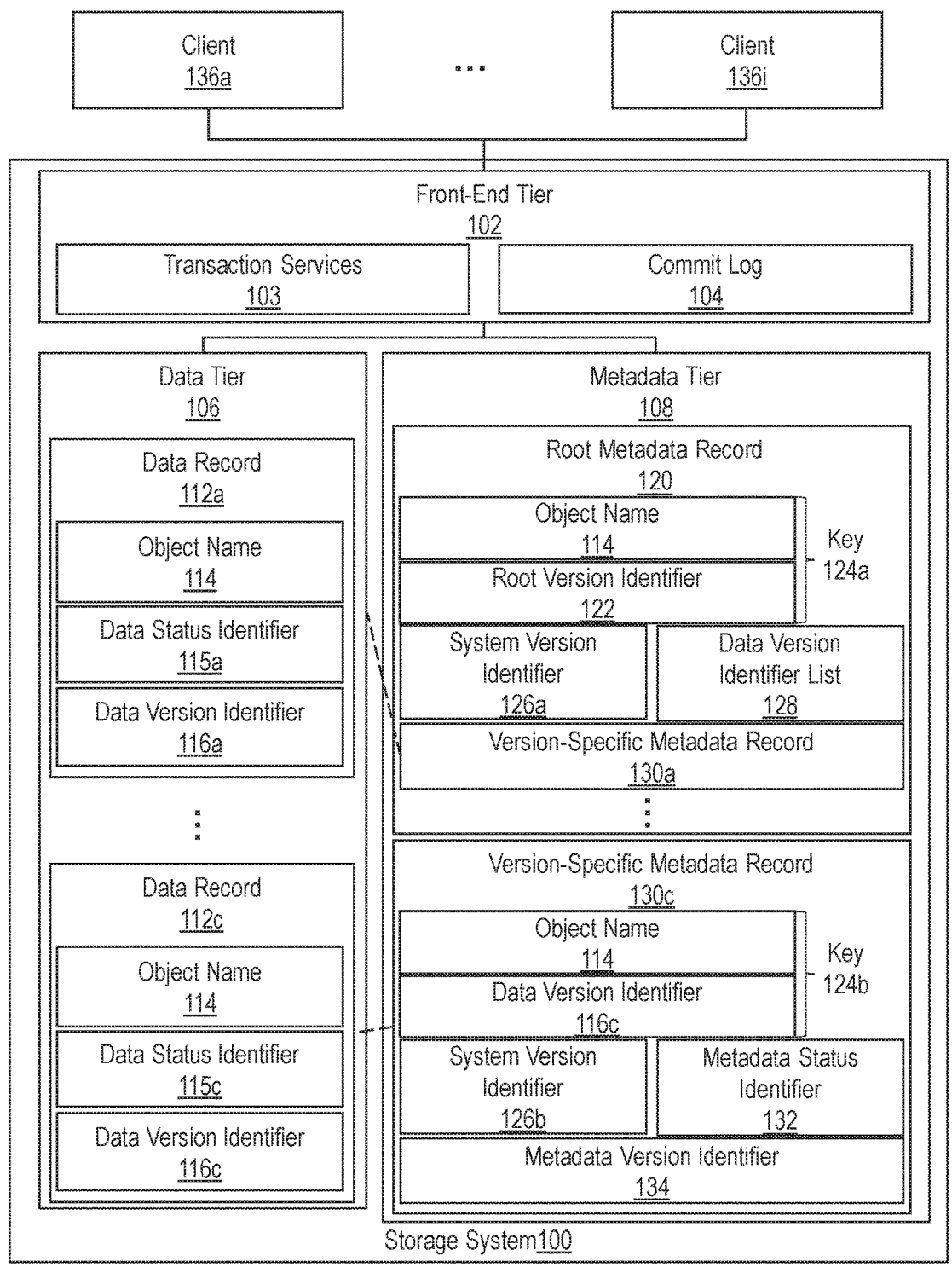
FIG. 1 illustrates an example storage system with a transaction management service for implementing a two-tier commit protocol, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW

Cloud storage systems may manage transactions using a variety of consistency models. One approach for providing strong consistency is to allocate a set of dedicated services that enforce transaction semantics through a distributed lock manager (DLM). A DLM in this context enforce constraints on reading and writing object data within the storage system by granting locks on resources in a manner that serializes accesses to data objects. If a process is attempting to modify a data object, then the process obtains a write lock from the DLM. Other processes are prevented from writing to the same data object until the process modifying the data object releases the write lock back to the DLM. One disadvantage of this approach is that DLMs are challenging to scale within cloud environments due to the great number of potential failure points. If a process is granted a lock on a particular resource and subsequently fails, a deadlock may occur, which holds up other processes attempting to access the data object. In large-scale systems, the potential causes of deadlocks are significant, which may slow data access times and otherwise cause performance degradation.

Another strong consistency model involves partitioning object data and metadata. In this approach, each respective partition is assigned a dedicated transaction manager, which services requests to access data objects within the respective partition. Transactions for an object are always routed through the same transaction manager to control the order in which transactions on the data object are executed. Partitioning reduces inter-server transaction coordination traffic as a given transaction manager does not need to coordinate transaction commits with other transaction managers dedicated to separate partitions. However, having a single transaction manager per partition may become a bottleneck, especially for partitions that are frequently accessed.

Techniques are described herein for implementing a two-tier commit protocol that maintains strong consistency within centralized and/or distributed storage systems. In one or more embodiments, the two tier commit protocol splits the commit status of a transaction across a data tier and a metadata tier. The separation between tiers allows for strong consistency to be maintained without a DLM. In addition, the two-tier commit protocol does not require partitions of object data to be affined to a single transaction manager. Thus, the two-tier commit protocol may eliminate or significantly reduce the source of deadlocks and/or other bottlenecks encountered by other strong consistency models.

In one or more embodiments, a storage system implementing the two-tier commit protocol includes logic for determining whether to commit or abort a transaction. A "transaction" in this context represents a unit of work that is either fully committed or aborted. If committed, then the changes made by a transaction are persisted within the storage system. If a transaction is aborted, then the changes made, if any, are rolled back to return the storage system to a previous state.

In one or more embodiments, a storage system implementing the two-tier commit protocol is configured to perform, as separate operations, a commit of object data in the data tier and a commit of object metadata in the metadata tier. For instance, a particular client may request to store an object within the storage system. As part of a transaction for the client, a transaction manager may transmit the metadata associated with the object to a metadata tier of the storage system. When the metadata record is first created, the metadata record is set to a pending status. The metadata tier may then return an acknowledgment to the transaction manager indicating that the metadata record was successfully created.

If the transaction manager receives an acknowledgement that a metadata record has been created in the metadata tier originating from a particular client, then, in one or more embodiments, the transaction manager proceeds with transmitting the data payload to a data tier of the storage system. The transaction manager may then wait until the data tier returns an acknowledgement indicating that a data record was successfully generated with a pending status. If the transaction manager receives an acknowledgment from the data tier, the transaction manager updates the metadata record to a committed status. Once the metadata record is committed, then the transaction manager or another process updates data record in the data tier to a committed status.

2. STORAGE SYSTEM ARCHITECTURE

FIG. 1 illustrates example storage system 100 with a transaction management service for implementing a two-tier commit protocol, in accordance with one or more embodiments. As illustrated in FIG. 1, system 100 includes front-end tier 102, data tier 106, and metadata tier 108. In one or more embodiments, storage system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, data tier 106 comprises hardware and/or software configured to store object data associated with objects of a storage system. As illustrated, data tier 106 includes one or more data records (such as data records 112a-c), each corresponding to a particular version of object data of an object. Each time a new object is created, a new data record is generated for storing the object data of the object. Each time the object data of an object is changed, a new data record is generated for storing the new object data of the object.

In one or more embodiments, a data record (such as data records 112a-c) is associated with an object name (such as object name 114), a data status identifier (such as data status identifiers 115a-c), and a data version identifier (such as data version identifiers 116a-c). Data records for different versions of object data corresponding to a same object are associated with a same object name but different data version identifiers. The data records for a same object include: (a) a current version of object data of the object, and (b) one or more outdated versions of object data of the object. As illustrated, data records 112a-c are associated with a same object name 114 but different data status identifiers 115a-c and different data version identifiers 116a-c.

A data version identifier is an identifier of a particular version of object data associated with an object. Each new data record is associated with a new data version identifier.

A data version identifier may be represented in a particular format. In an embodiment, a data version identifier is an integer that is incremented for each new version of object data associated with an object. In another embodiment, a data version identifier is a representation of a time at which a data record is generated. The data version identifier includes of one or more of the following components: an epoch, a physical time, and/or a logical time.

The physical time is derived from the clock of the system. The physical time indicates a time at which an event occurs. As an example, the physical time may indicate a time at which a data record is generated.

The epoch is a time period during which there is no significant change and/or adjustment in the clock of the system. The epoch is incremented every time the clock is changed and/or adjusted. As an example, one epoch may be designated for a time period in which a system clock is set according to Pacific Daylight Time. The epoch may be incremented when the system clock is set according to Pacific Standard Time. As another example, a current time may be Nov. 1, 2016, at 10:00 a.m. However, a clock of a system may be erroneously set to indicate that the current time is Nov. 1, 1916, at 10:00 a.m. An administrator may notice the error and adjust the clock to accurately reflect the current time. One epoch may be designated for the time period prior to the adjustment by the administrator. Another epoch may be designated for the time period subsequent to the adjustment by the administrator.

The logical time is used to identify an ordering of events that occur at the same physical time. As an example, Data Record A and Data Record B may be generated at the same physical time, "12:00:35." Data Record A may be associated with a logical time of "0." Data Record B may be associated with a logical time of "1." The logical time indicates that Data Record A was generated before Data Record B.

In one or more embodiments, metadata tier 108 comprises hardware and/or software configured to store metadata associated with objects of a storage system. As illustrated, metadata tier 108 includes one or more root metadata records (such as root metadata record 120). Additionally or alternatively, metadata tier 108 includes one or more version-specific metadata records (such as version-specific metadata records 130a-c).

In one or more embodiments, a version-specific metadata record includes metadata corresponding to a particular version of object data of an object. Each time a new object is created, a new version-specific metadata record is generated for storing the metadata of the object. Each time the object data of an object is changed, a new version-specific metadata record is generated for storing the metadata associated with the new object data of the object.

Each time the metadata corresponding to a particular version of object data of an object is changed, the existing metadata record for the particular version of object data is overwritten with new metadata. The metadata may change due to a user request and/or a system request. User requests may be received from a user via a user interface and/or application programming interface (API). System requests may be received from an application and/or a process. As an example, metadata associated with an object may include a flag indicating whether a transaction event record of the object has been published. After publishing a particular transaction event record, a publisher may request that the flag associated with the particular transaction event record become marked. The request from the publisher is an example of a system request to modify the metadata of the object.

As described above, each data record includes a particular version of object data of an object. Further as described above, each version-specific metadata record includes metadata corresponding to a particular version of object data of an object. Hence, there is a one-to-one mapping between data records and version-specific metadata records. A version-specific metadata record may include a pointer and/or a reference to a data record corresponding to the version-specific metadata record. As illustrated, version-specific metadata record 130a corresponds to data record 112a. Version-specific metadata record 130c corresponds to data record 112c.

In one or more embodiments, a version-specific metadata record (such as version-specific metadata records 130a-c) is associated with an object name (such as object name 114), a data status identifier (such as metadata status identifier 132), a data version identifier (such as data version identifier 116c), a system version identifier (such as system identifier 126b), a metadata status identifier (such as metadata status identifier 132), and a metadata version identifier (such as metadata version identifier 134. A version-specific metadata record is associated with the same object name and the same data version identifier as the data record corresponding to the version-specific metadata record. As illustrated, version-specific metadata record 130c and data record 112c are associated with a same object name 114 and a same data version identifier 116c.

A metadata version identifier (such as metadata version identifier 134 may comprise a user metadata version identifier and/or a global metadata version identifier. A user metadata version identifier in this context refers to an identifier of a particular version of metadata corresponding to a particular version of object data an object. The user metadata version identifier is updated every time the metadata is changed in response to a user request. A user metadata version identifier may be represented in a particular format. As an example, a user metadata version identifier may be represented as an integer. A newly generated metadata record may be associated with a user metadata version identifier of "0." The user metadata version identifier may be incremented by one on every user-initiated change to the metadata.

A global metadata version identifier is an identifier of a particular version of metadata corresponding to a particular version of object data an object. The global metadata version identifier is updated every time the metadata is changed in response to a user request and/or a system request. A global metadata version identifier may be represented in a particular format. As an example, a global metadata version identifier may be represented as an integer. As another example, a global metadata version identifier may be a representation of a time at which the metadata record is generated and/or changed. The global metadata version identifier may include: (a) an epoch, (b) a physical time, and (c) a logical time.

In one or more embodiments, a version-specific metadata record (such as version-specific metadata records 130a-c) may be embedded within a root metadata record 120. Additionally or alternatively, a version-specific metadata record (such as version-specific metadata record 130c) may be stored separately from a root metadata record 120. An embedded version-specific metadata record and a non-embedded version-specific metadata record may include similar information, such as an object name, a data version identifier, a user metadata version identifier, and a global metadata version identifier. An embedded version-specific metadata record and a non-embedded version-specific metadata record may be similarly structured and/or organize information according to a similar schema. A single object may be associated with one or more version-specific metadata records that are embedded within a root metadata record and/or one or more version-specific metadata records that are stored separately from a root metadata record.

In one or more embodiments, root metadata record 120 maintains metadata that is common to all versions of object data of an object. A single root metadata record 120 is stored for an object, regardless of how many versions of object data corresponding to the object.

In one or more embodiments, root metadata record 120 is associated with object name 114, root version identifier 122, and data version identifier list 128.

A root version identifier (such as root version identifier 122) is an identifier corresponding to all root metadata record stored within a storage system. A root version identifier is the same identifier for root metadata records corresponding to different objects. A root version identifier may be represented in a particular format. As an example, a root version identifier may be the integer "0."

A data version identifier list (such as data version identifier list 128) includes data version identifiers corresponding to all version of object data of the object. As illustrated, data records 112a-c includes versions of object data corresponding to an object associated with object name 114. Root metadata record 120 corresponds to the object associated with object name 114. Root metadata record 120 includes data version identifier list 128. Data version identifier list 128 includes data version identifiers 116a-c associated with data records 112a-c, respectively. In other embodiments, data version identifier list 128 includes at least a data version identifier corresponding to a current version of object data of the object.

In one or more embodiments, metadata tier 108 includes a plurality of entries. The plurality of entries may be, for example, a plurality of rows of one or more tables. Embedding a version-specific metadata record within root metadata record 120 refers to storing the root metadata record 120 and the embedded version-specific metadata record in a same entry within metadata tier 108. Storing a version-specific metadata record separately from a root metadata record 120 refers to storing root metadata record 120 and the version-specific metadata record in different entries within the metadata tier 108. Further, each version-specific metadata record that is stored separately from root metadata record 120 may be stored in a different entry within the metadata tier 108.

Each entry within metadata tier 108 is accessed using a different key (such as keys 124a-b). As an example, each row of a table within a metadata tier is accessed using a different key. A key is a unique identifier used to identify a particular entry within metadata tier 108. Key 124a of root metadata record 120 includes object name 114 and root version identifier 122. Key 124a is used to access root metadata record 120 and any embedded version-specific metadata records 130a-c. Key 124b of a non-embedded version-specific metadata record 130c, corresponding to a version-specific metadata record, includes object name 114 and data version identifier 116c. A different key is used to access each non-embedded version-specific metadata record corresponding to a same object.

As illustrated, for example, root metadata record 120 is accessed using key 124a. The embedded version-specific metadata records may be accessed using the same key 124a. The version-specific metadata record 130c that is stored separately from the root metadata record 120 is accessed using a different key (key 124b).

Each entry within metadata tier 108 is associated with a system version identifier (such as system version identifiers 126a-b). As illustrated, root metadata record 120 is stored in a particular entry and is associated with system version identifier 126a. Version-specific metadata record 130c, which is not embedded, is stored in a different entry and is associated with a different system version identifier (system version identifier 126b). Storage system 100 uses a system version identifier to track updates to the associated entry within metadata tier 108. A system version identifier is modified each time that the corresponding entry of the metadata tier 108 is modified.

In one or more embodiments, the entries within metadata tier 108 are grouped into a plurality of shards. A shard may include, for example, a particular set of rows of a table or some other portion of a data object. The root metadata record and version-specific metadata records corresponding to a same object are stored in a same shard.

In one or more embodiments, metadata tier 108 supports atomic transactions over only a single row, or a single shard. Operations affecting a single row, or rows of a single shard, may be completed in a single atomic transaction. Operations affecting multiple rows of multiple shards cannot be completed in a single atomic transaction. An atomic transaction performed by a particular thread is a transaction that cannot be partially completed. An atomic transaction is successful if fully completed and fails if not completed.

In one or more embodiments, data tier 106 and/or metadata tier 108 are implemented using one or more data repositories. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as front-end tier 102. Alternatively or additionally, a data repository may be implemented or executed on a computing system separate from front-end tier 102. A data repository may be communicatively coupled to front-end tier 102 via a direct connection or via a network. Different tiers may transmit messages and data to other tiers using one or more network communication protocols, such as communication protocols associated with the Internet Protocol (IP) Suite. In addition or alternatively, different tiers may transmit data using one or more communication protocols for passing messages between components executing on the same host machine, such as issuing function calls, issuing interrupts, and posting work requests in a queue.

In one or more embodiments, front-end tier 102 comprises hardware and/or software configured to expose a user interface and/or an application programming interface (API) for receiving requests. The API may conform to a Representational State Transfer (REST) architectural style. The commands exposed through the API may include but are not limited to:

(a) storing a particular version of object data of an object in a storage system;

(b) reading a particular version of object data of an object in a storage system; and (c) deleting a particular version of object data of an object from a storage system.

In one or more embodiments, front-end tier 102 includes transaction services 103 and commit log 104. Transaction services 103 includes a set of one or more processes (or threads) for handling transactions requested by clients 136a-i. For example, responsive to a request to write an object to storage system 100, transaction services 103 may interact with metadata tier and data tier 106 to complete a write transaction. Transaction services 103 may also determine whether to commit or abort a pending transaction. In one or more embodiments, transaction services 103 acts as a transaction manager that is configured to implement the two-tier protocol described in further detail herein.

Commit log 104 maintains a record of the status of requested transactions. In one or more embodiments, a transaction may be in one of three states: a pending state, a committed state, or an abort state. Transaction services 103 updates commit log 104 to track the status of client requests. For example, in response to a client request, transaction services 103 may create a new entry in commit log 104 and set the status to pending. Once the transaction is committed or aborted, transaction services 103 changes the status in the commit log accordingly. Transaction services 103 may then return an acknowledgment or notification to the requesting client to identify the final status of the transaction.

In one or more embodiments, a transaction may transition from the pending state to either the commit state of the abort state. However, the transaction is prevented from transitioning back to the pending state. The transaction may also be prevented from transitioning from the commit state to the abort state or from the abort state to the committed state. These state transitions enforce the atomicity of the transaction, preventing transactions from being partially completed.

In one or more embodiments, front-end tier 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant ("PDA").

Clients 136a-i represent processes, applications, or users for which storage system 100 stores data. For example, clients 136a-i may include, but are not limited to one or more instances of a database server, application server, middleware application or some other resource. In a cloud environment, a client may correspond to a database-as-a-service (DBaaS), software-as-a-service (SaaS), platform-as-a-service (PaaS) or any other cloud resource. Clients 136a-i may reside locally or be remote from storage system 100.

3. TWO-TIER COMMIT PROTOCOL

A. Transaction Commits and Aborts

Figure 2:
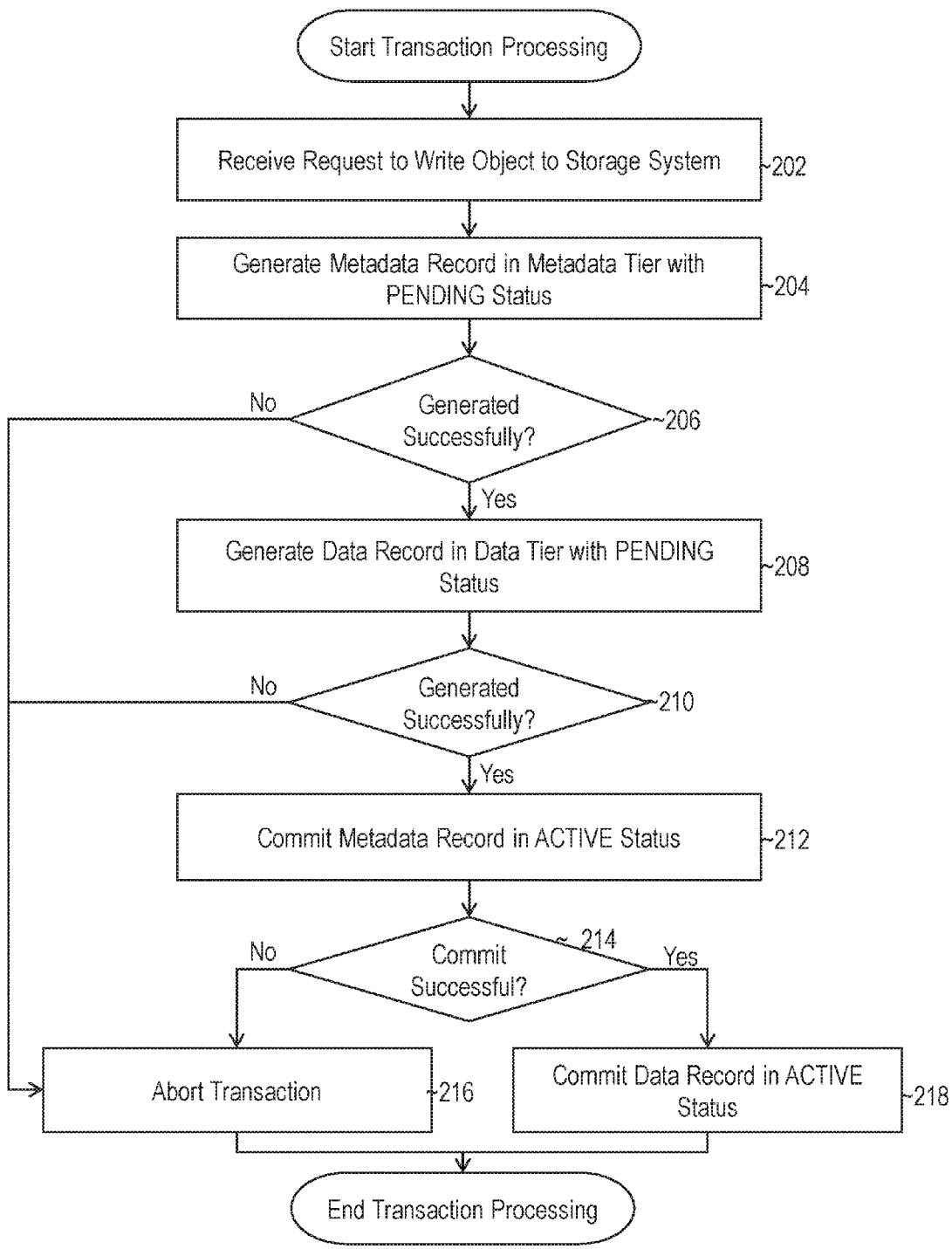
FIG. 2 illustrates an example set of operations for implementing a two-tier commit protocol, in accordance with one or more embodiments.

In one or more embodiments, storage system 100 is configured to enforce a two-tier commit protocol that determines whether a transaction should be committed or aborted. FIG. 2 illustrates an example set of operations for implementing a two-tier commit protocol, in accordance with one or more embodiments. At the start of a transaction, storage system 100 receives, from a client, a request to write an object to storage system 100 (Operation 202). The request may correspond to an update that writes a new version of an object for which previous versions already exist within storage system 100 or may correspond to an operation for putting a new object for which no previous versions have been stored within storage system 100.

In response to receiving the request, storage system 100 generates a metadata record in metadata tier 108 (Operation 204). When first generated, the metadata record is assigned a PENDING status. For example, in the event that client 136a has requested to write a new version of an object, storage system 100 may generate version-specific metadata record 130c and initially assign metadata status information 132 a value of "PENDING". When a metadata record residing in metadata tier has a PENDING status, the metadata record is not in a committed state.

In one or more embodiments, storage system 100 determines whether the metadata record was successfully generated within metadata tier 108 (Operation 206). If the metadata record was not successfully generated, then the transaction is aborted. (Operation 216). In one or more embodiments, storage system 100 waits for a threshold amount of time for the metadata record to be successfully generated. If the operation does not complete within the threshold amount of time, storage system 100 may determine that the record was not successfully generated. Potential causes of failure may include but are not limited to hardware malfunctions, conflicting transactions, dropped connections (such as lost network or database connections), and overloaded resources within metadata tier 108.

If the metadata record has been successfully generated, then storage system 100 generates a data record in data tier 106 (Operation 208). When first generated, the data record is assigned a PENDING status. For example, once version-specific metadata record 130 has been successfully generated within metadata tier 108, storage system 100 may generate data record 112c within data tier 106 and initially assign data status identifier 115c a value of "PENDING". In one or more embodiments, data record 112c further stores object name 114, data version identifier 116c, and a data payload, such as a BLOB, within data record 112c. Data records within data tier 106 are not considered committed while the record has a PENDING status.

In one or more embodiments, storage system 100 determines whether the data record was successfully generated within data tier 106 (Operation 210). If the data record was not successfully generated, then the transaction is aborted. (Operation 216). In one or more embodiments, storage system 100 waits for a threshold amount of time for the data record to be successfully generated. If the operation does not complete within the threshold amount of time, storage system 100 may determine that the record was not successfully generated. Potential causes of failure may include but are not limited to hardware malfunctions, conflicting transactions, dropped connections (such as lost network or database connections), and overloaded resources within data tier 106.

If the data record is successfully generated within data tier 106, then storage system 100 commits the metadata record within metadata tier 108 (Operation 212). Upon successful creation of data record 112c, for instance, storage system 100 may update metadata status identifier 132 within version-specific metadata record 130c to ACTIVE. Metadata records with an ACTIVE status are considered as having a committed status.

In one or more embodiments, storage system 100 determines whether the metadata record was successfully committed (Operation 214). For instance, if the metadata record is not committed within a threshold period of time from the start of the transaction, then storage system 100 may consider the transaction unsuccessful and process to operation 216. If the metadata record is committed within the threshold period of time, however, then the transaction is considered committed.

If the transaction fails at any of the points previously mentioned, then the transaction is aborted (Operation 216). In one or more embodiments, storage system 100 aborts the transaction by updating the status of the metadata record as "ABORTED" or to some other state indicating that the pending data record is not valid. After the metadata record has been updated, storage system 100 may then purge or delete the corresponding data record generated as part of the aborted transaction. For instance, if version-specific metadata record 130c and data record 112c were both created with a PENDING status, and the transaction is subsequently aborted, then metadata record 130c may be updated to an aborted status. Storage system 100 may subsequently purge data record 112c and versions-specific metadata record 130c. In one or more embodiments, aborting a transaction rolls storage system 100 back to a previous state. For instance, storage system 100 may have stored three version-specific metadata records within metadata tier 108 and three data records within data tier 106 for a particular data object prior to the start of a transaction. During processing of the transaction, storage system 100 may generate a fourth version-specific metadata record within metadata tier 108. If the transaction is aborted, then the fourth version-specific metadata record may be purged and the other three version-specific metadata records and data records maintained. Thus, storage system 100 is returned to the same state that existed at the time the transaction was initiated.

If the metadata record is committed successfully, then storage system 100 commits the data record (Operation 218). Upon successful creation of data record 112c, for instance, storage system 100 may update metadata status identifier 132 within version-specific metadata record 130c to ACTIVE. Metadata records with an ACTIVE status are considered as committed within data tier 106.

In one or more embodiments, a transaction is treated as committed before the data record is updated to an ACTIVE status if the metadata record has been committed. For example, once operation 212 is complete and before operation 218 is complete, front-end tier 102 may update commit log 104 to indicate that the transaction is committed. In addition or alternatively, front-end tier 102 may return an acknowledgment to one or more clients that the transaction was committed even though the data record may not have been update to an ACTIVE status. Metadata tier 108 may thus act as an authoritative source on whether a new object has been committed or not. The status information in data tier 106 is useful to facilitate auditing and data integrity checks as described in further detail below. In other embodiments, front-end tier 102 may wait until operation 218 completes to commit the transaction within commit log 104 and/or send a notification to clients that a transaction has committed.

In one or more embodiments, clients are prevented from viewing data records having a PENDING status. For example, if a client tries to read object data that has a corresponding metadata record that is PENDING, the request may be denied. As described further below, a previous version of the data object may be returned in some embodiments. In other embodiments, an error or notification that the data object could not be accessed may be returned to the client. By preventing access to objects data associated with a PENDING transaction, the partial and corrupted data remains invisible to the client.

B. Inter-Tier Interactions

Figure 3:
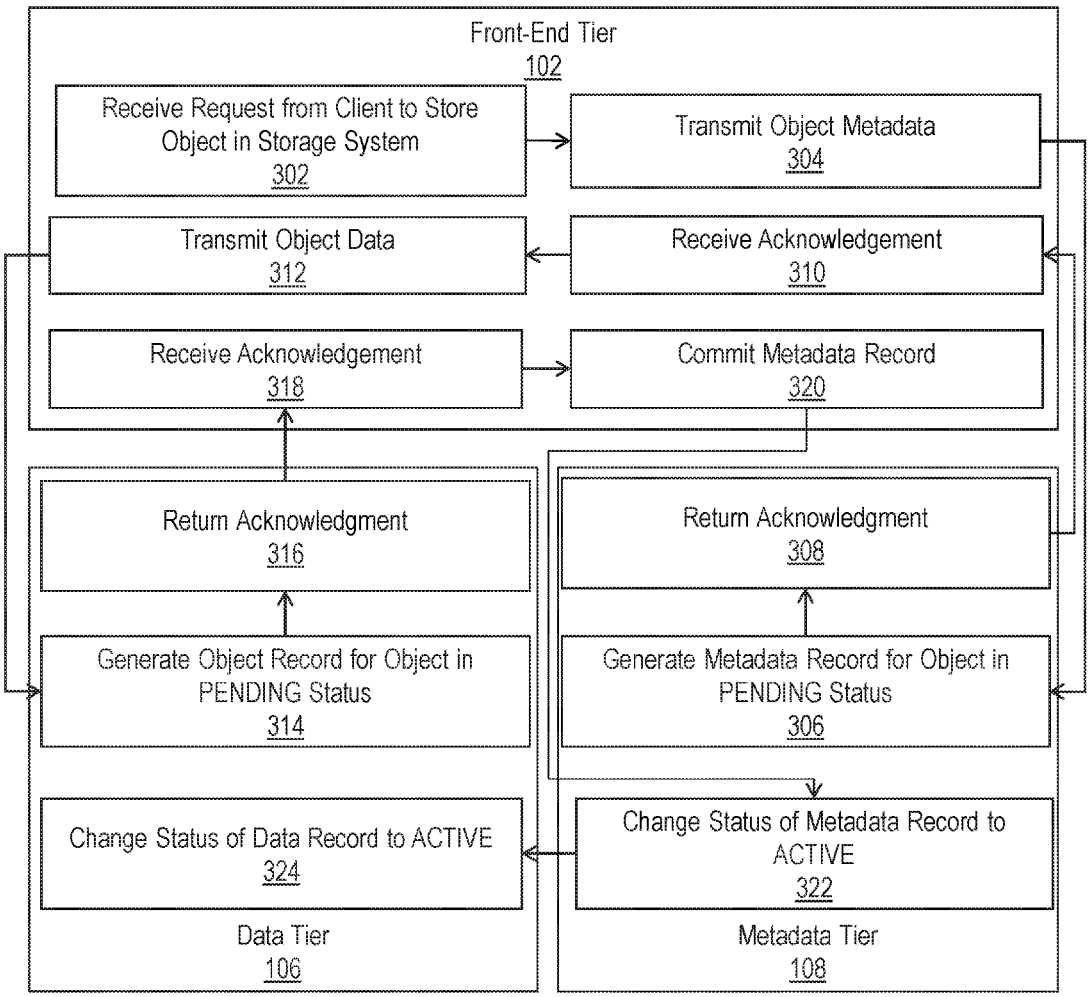
FIG. 3 illustrates an example set of interactions between different tiers of a storage system, in accordance with one or more embodiments.

In one or more embodiments, the two-tier commit protocol includes various interactions between multiple tiers of a storage system. These tiers may include, but are not limited to, front-end tier 102, data tier 106, and metadata tier 108. FIG. 3 illustrates an example set of interactions between different tiers of a storage system, in accordance with one or more embodiments. Front-end tier 102 is responsible for interfacing with storage clients. Storage clients may submit write requests (such as object PUT commands), Front-end tier 102 receives a request from a client to store an object in storage system 100 (Operation 302). In one or more embodiments, the client request includes object data, such as a BLOB or any other type of data payload, and object metadata, such as an object name and version.

Upon receiving the request, front-end tier transmits the object metadata to metadata tier 108 (Operation 304). Example metadata may include, but is not limited to, an object name, version, owner, and other information about the object. In one or more embodiments, front-end tier 102 may connect with metadata tier 108 over one or more data communications networks, such as a storage area network (SAN), local area network (LAN), wide area network (WAN) or the Internet. Front-end tier 102 may transmit the information using one or more network protocols such as protocols within the IP suite. In other embodiments, front-end tier 102 and metadata tier 108 may reside on the same host machine. For example, front-end tier 102 and metadata tier 108 may correspond to different layers in a multilayered software system. Front-end tier 102 may transmit the metadata to metadata tier 108 using APIs, calls, inter-tier messages, or any other interface that allows different tiers to communicate.

In response to receiving the metadata from front-end tier 102, metadata tier 108 generates a metadata record for the object (Operation 306). The metadata record includes the metadata transmitted by front-end tier 102. The metadata record may further include metadata generated by metadata tier 108 for the object. For example, metadata tier 108 may generate a system version identifier, metadata status identifier, and a metadata version identifier. Metadata tier 108 initially generates the metadata record with a PENDING status.

Metadata tier 108 returns an acknowledgment to front-end tier 102 indicating the metadata record for the object was successfully created in a PENDING state (Operation 308).

Front-end tier 102 receives the acknowledgment from metadata tier 108 indicating that the metadata record for the object was successfully created in a PENDING state (Operation 310).

In response to the acknowledgment received at operation 310, front-end tier transmits the object data to data tier 106 (Operation 312). In one or more embodiments, the object data includes a data payload such as a BLOB. In some cases, the object data may include a portion or all of the metadata transmitted to metadata tier 108. For example, the object data may include an object name, version information, etc. Front-end tier 102 may connect with data tier 106 over one or more data communications or may reside on the same host machine as previously described. Thus, the protocols and interfaces used to transmit the data between tiers may vary from implementation to implementation.

In response to receiving the object data from front-end tier 102, data tier 106 generates an object record for the object (Operation 314). The object record includes the object data transmitted by front-end tier 102. The object record may further include other object data generated by data tier 106 for the object. For example, data tier 106 may generate a data status identifier, storage location information, and version information. Data tier 106 initially generates the data record with a PENDING status.

Data tier 106 returns an acknowledgment to front-end tier 102 indicating the data record for the object was successfully created in a PENDING state (Operation 316).

Front-end tier 102 receives the acknowledgment from data tier 106 indicating that the data record for the object was successfully created in a PENDING state (Operation 318).

In response to the acknowledgment received at operation 318, front-end tier 102 transmits a request to commit the metadata record to metadata tier 108 (Operation 320). In one or more embodiments, the request includes the location information generated by data tier 106. For example, the request may specify a physical address, offset, volume identifier, and/or other information that may be used to access the object data written to data tier 106.

In response to receiving the request to commit the metadata record, metadata tier 108 changes the status for the metadata record from PENDING to ACTIVE (Operation 322). In one or more embodiments, metadata tier 108 may also change the status of one or more other metadata records during this operation. For a given object, there may be multiple versions stored by storage system 100. In one or more embodiments, only one version of a metadata record permitted to be in an ACTIVE state. In this scenario, whenever a new version-specific metadata record is changed to an ACTIVE status, the metadata record for a previously committed version is changes to an INACTIVE status. In addition or alternatively, metadata tier 108 may add location information received from front-end tier 102 to the metadata record. For example, metadata tier 108 may add the volume ID, offset, storage address, and/or any other location information that maps the metadata record to the storage location of the object data residing in data tier 106.

Once the metadata record has been committed, data tier 106 changes the status of the data record to an ACTIVE state (Operation 324). The manner and timing of the update may vary depending on the implementation. In one or more embodiments, the update is performed asynchronously by a background process as described in further detail below. In other embodiments, front-end tier 102 may submit a request to commit the data record responsive to receiving an acknowledgment that the metadata record is committed.

In one or more embodiments, only one version of an object is permitted to have an ACTIVE status at a given point in time. When a new object becomes active, previously committed versions of the object are changed to an INACTIVE state. Inactive states may include, but are not limited to, a TOMBSTONED state, a MARKED FOR DELETION state, and a DELETED state. In the TOMBSTONED state, the inactive/previous version of the data object remains within storage system. Thus, performing a write of an object may generate a new version of the object and not overwrite previously existing versions, including previously existing data records and metadata records. Rather, the previous records may be changed to a TOMBSTONED status. In the MARKED FOR DELETION state, the version of the data object is marked for deletion but continues to reside within storage system 100. Deletion may be performed by a background process or some triggering event. In the DELETED state, the version of the data object is removed from storage system 100. The version may be migrated to an archive or may be purged from storage, depending on the particular implementation.

C. Concurrent Transaction Processing

In one or more embodiments, the two-tier commit protocol prevents more than one write transaction on an object at a given point in time. If concurrent transactions are attempting to write to the same object, then the earliest initiated transaction is aborted. Aggressive aborts provide last-write-wins semantics, where the last write transaction in a set of concurrent write transactions on an object is committed. This approach is beneficial when concurrent operations on a single object are rare.

Figure 4:
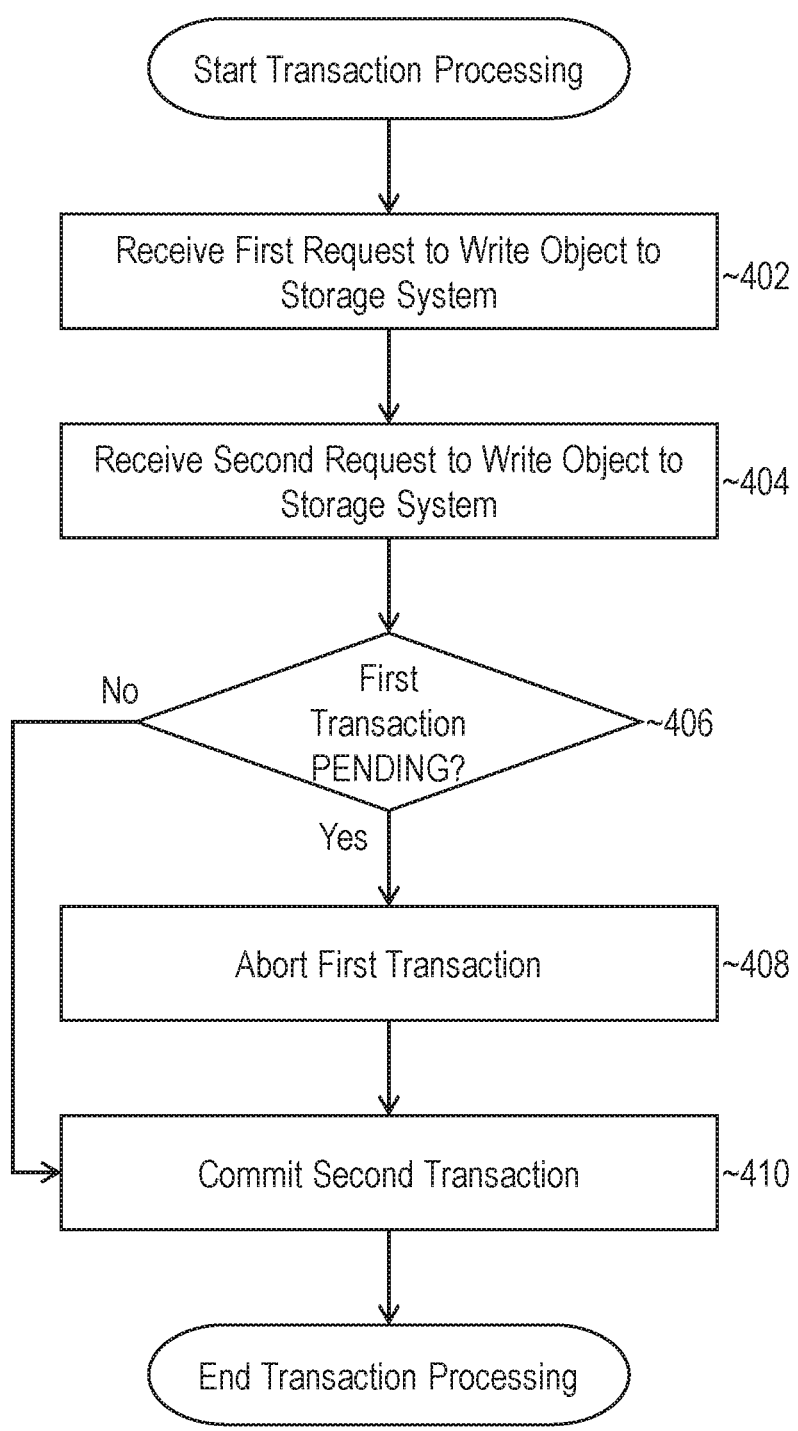
FIG. 4 illustrates an example set of operations for processing concurrent transactions, in accordance with one or more embodiments.

FIG. 4 illustrates an example set of operations for processing concurrent transactions, in accordance with one or more embodiments. Front-end tier 102 receives a first request to write an object to storage system 100 (Operation 402). In response to receiving the first request, front-end tier may initiate a first transaction processing according to techniques previously described in the sections above.

While the first transaction is pending, front-end tier 102 receives a second request to write a different version of the object to storage system 100 (Operation 404). The second request may originate from a different client than the first request or the same client, depending on the particular implementation. For example, two different users of a DBaaS may be attempting to write to the same table or some other database object. The second request may come at various points in time while the first transaction is pending. For example, the request may be received before the metadata record for the first transaction is created. As another example, the request may be received after the metadata record is created, but before the data record is created. In yet another example, the request may be received after both the metadata record and the data record are created, but while the records are still in a PENDING state.

In response to receiving the second request, front-end tier 102 determines whether the first request is pending or committed (Operation 406). In one or more embodiments, front-end tier 102 determines whether the request is pending based on the metadata record associated with the first request. If the metadata record has not been generated or is in a PENDING state, then front-end tier 102 may classify the request as pending. If the metadata record has an ACTIVE state, then the first requested transaction has already been committed.

If pending, then front-end tier 102 aborts the first write transaction (Operation 408). Metadata records and/or data records generated for the first transaction may be deleted from storage system 100. Thus, storage system 100 is rolled back to the state that existed prior to the first write transaction.

Once the first transaction is committed or aborted, front-end tier 102 proceeds with committing the second transaction (Operation 410).

An alternative to the above approach is to abort new write transactions when there is a currently pending write transaction on the same object. One challenge with this approach is that stalled transaction may result in other stalled or aborted transactions. To prevent this scenario, a deterministic model could be implemented to distinguish between actual failures and slow running transactions. If a pending transaction is determined to have failed, the pending transaction may be aborted and the new write transaction performed. If the pending transaction has not failed, then the new write transaction may be aborted instead.

In other embodiments, conflicting transactions may be resolved at commit time rather than during the prepare phase. This approach may be used to provide first-write wins semantics. For example, the first transaction to generate a data record within storage system 100 may be committed while the transaction that has not written the data record is aborted.

D. Data Tier Audits

Transactions may fail for a variety of reasons. In some cases, a failed transaction may result in a partial upload of data to storage system 100. For example, if a server crashed in the middle of an upload, only a portion of the data payload may be stored. In other cases, the entire data payload may be uploaded, but the commit process may have failed. In these scenarios, clients 136*a-i* are prevented from viewing corrupt or partially uploaded data because the transaction is not committed within metadata tier 108. Future transactions cause these stalled transactions to be aborted, and read operations will skip pending transactions as detailed below.

Integrity within storage system 100 may also be protected by performing audits within data tier 106. For any data records in PENDING status, the auditor queries a service for the current status of the corresponding metadata record in metadata tier 108. The auditor then determines whether to abort or commit the data record in PENDING status. If the corresponding metadata record has been committed, then the data record is changed to a committed status as well. On the other hand, the auditor may purge the data record if the metadata record is also PENDING.

Figure 5:
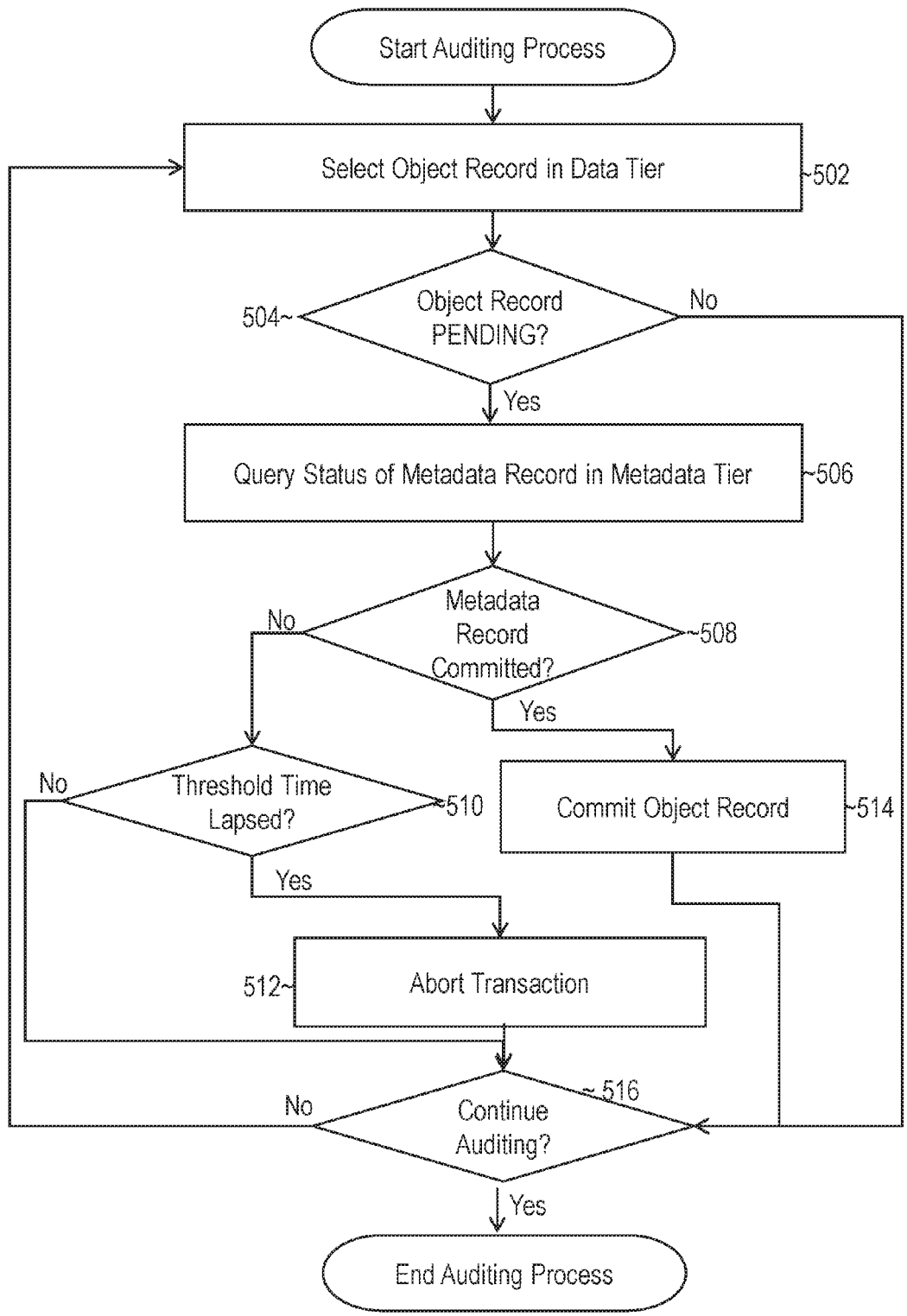
FIG. 5 illustrates an example set of operations for auditing a data tier, in accordance with one or more embodiments.

FIG. 5 illustrates an example set of operations for auditing a data tier, in accordance with one or more embodiments. The auditing process may be performed periodically, continuously, in response to detecting a particular event (e.g., a new client request), or on demand, depending on the particular implementation. The auditing process may be performed asynchronously to the transaction processes previously described above.

Referring to FIG. 5, an auditing process running within storage system 100 selects an object record in data tier 106 (Operation 502). The object records may be processed in any order, such as in sequential order by physical address location, in random order, or in an order specified by an administrator.

The auditing process determines whether the selected object has a PENDING status (Operation 504). For example, if data record 112c is selected, the auditing process may determine the value assigned to data status identifier 115c. If the auditing process determines that the record is in a committed state, then the auditing process may skip to operation 516.

If the selected object record is PENDING, then the auditing process queries the status of the corresponding metadata record in the metadata tier (Operation 506). In the example where data record 112c is being analyzed, the auditing process may query the status of version-specific metadata record 130c. The query may include key 124b to identify the corresponding metadata record. The status of version-specific metadata record 130c may be determined from metadata status identifier 132. Version-specific metadata may be in a committed state, such as an ACTIVE state, or an uncommitted/PENDING state.

After the metadata record has been fetched, the auditing process determines whether the metadata record has a committed status based on the query response (Operation 508). If the metadata record is not committed, then the process continues to operation 510. Otherwise the process continues to operation 514.

If the metadata record is in a PENDING state, the auditing process determines whether a threshold amount of time has lapsed (Operation 510). The time period may vary depending on the particular implementation. For example, the threshold may be specified in terms of days, hours, minutes, etc. with respect to the start time of the transaction. If the threshold time has not lapsed, then the transaction is not aborted. The threshold may be used to prevent prematurely aborting pending transactions.

If the threshold time has lapsed, then the auditing process aborts the pending transaction (Operation 512). The selected object record and the corresponding metadata record may then be purged from storage system 100.

If the metadata record is committed, however, the auditing process commits the selected object record (Operation 514). The status of the object record is updated to match the status of the corresponding metadata record at this operation. If version-specific metadata record 130c has an ACTIVE status, for instance, then the auditing process may update data status identifier 115c from PENDING to ACTIVE. The auditing process may change the previously committed data record for the object to an INACTIVE status as well.

Once the object record is committed or aborted, the process determines whether to continue auditing storage system 100 (Operation 516). As previously indicated, auditing may be performed continuously, over a fixed period of time, or on a fixed set of object records, depending on the particular implementation. In the event that auditing continues, the auditing process returns to operation 502 and selects a different object record to audit. Otherwise the process ends.

E. Object Reads

In one or more embodiments, the two-tier commit protocol does not abort pending write transactions in the event the event of concurrent reads on the same object being written. Instead, a read operation returns the last committed object version. If a metadata record for a version has a PENDING status, then the read operation ignores the corresponding version of the data object.

Figure 6:
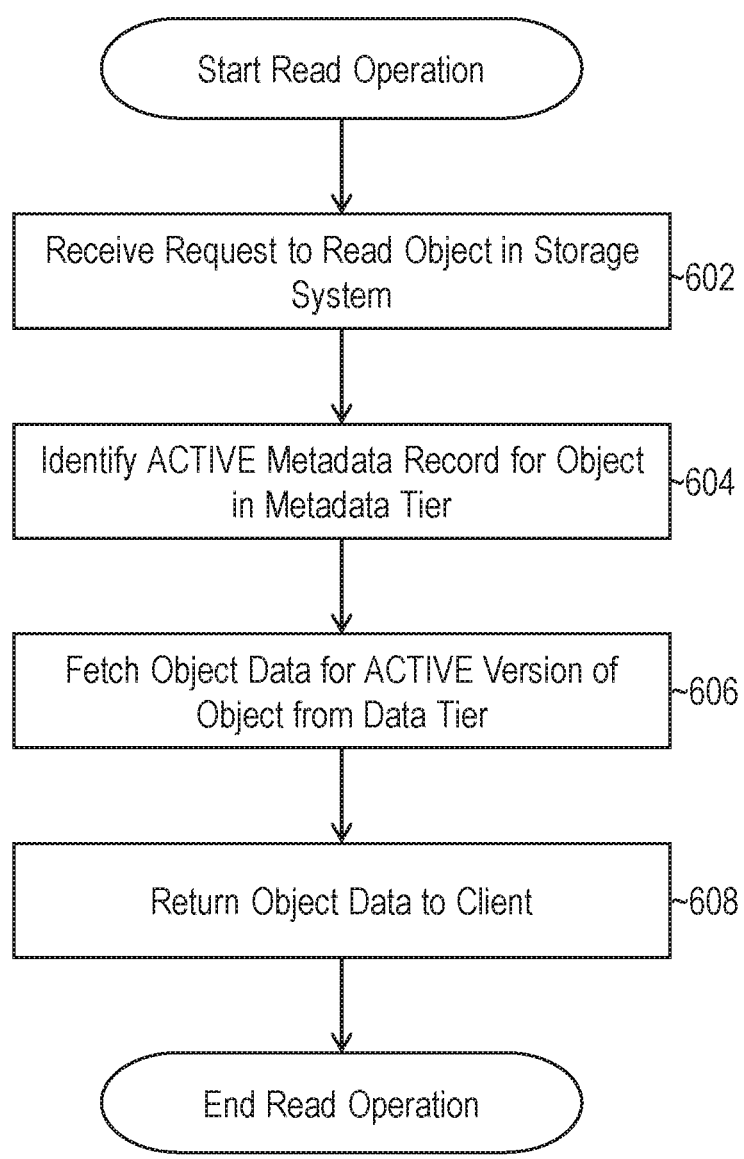
FIG. 6 illustrates an example set of operations for performing a read operation, in accordance with one or more embodiments.

FIG. 6 illustrates an example set of operations for performing a read operation, in accordance with one or more embodiments. Front-end tier 102 initially receives a request from a client to read an object within storage system 100 (Operation 602).

In response to the client request, front-end tier 102 queries metadata tier 108 to identify the ACTIVE metadata record for the object (Operation 604). Front-end tier 102 ignores PENDING metadata records associated with pending, concurrent write transaction, if any.

Front-end tier 102 uses the location information stored within the ACTIVE version of the metadata record to fetch the corresponding version of the object from data tier 106 (Operation 606). In one or more embodiments, the version of the object record for may still have a PENDING status for the version of the data object fetched from data tier 106. This scenario may occur where a READ operation is executed after the metadata record has been committed but before the auditing process has committed the corresponding object record. If this occurs, then data tier 106 may update the status of the object record to an ACTIVE state.

Once retrieved, front-end tier 102 returns the object data to the requesting client (Operation 608). Thus, the read operation returns the data payload for the most recently committed object. Pending write transactions that have not committed in metadata tier 108 are ignored. In the event that the last committed version has been deleted, then an error message may be returned.

F. Object Deletes

As previously indicated, front-end tier 102 is configured to process requests to delete an object in accordance with one or more embodiments. In response to receiving a delete request, front-end tier 102 marks the metadata record for the object as deleted. The object record may remain unmodified by front-end tier 102 at this phase. The object record may be subsequently deleted by a garbage collection process, which may account for lifetime retention and versioning policies defined within the system, if any.

In one or more embodiments, object deletions account for lifetime retention and versioning policies. A lifetime retention and versioning policy defines how long object records are maintained within data tier 106 in terms of physical time, logical time, or a number of versions. As an example, a policy may specify that storage system 100 should retain four versions of a data object. If a fifth version of the object is written to storage system 100, then the object and metadata record for the first version may be deleted from data tier 106 and metadata tier 108, respectively. As another example, a policy may specify that storage system 100 should retain objects for a period of four months. The garbage collection process may wait four months before deleting objects that have been marked for deletion within metadata tier 108. The thresholds specified in a policy may vary from implementation to implementation, and may be configured by an end user, such as a system administrator.

In one or more embodiments, a request to delete an object causes all pending transactions on the object, if any, to be aborted. For example, if version-specific metadata record 130c is in a PENDING state when an object delete is received, the metadata record is not updated to an ACTIVE state. Rather, the version-specific metadata record is purged from storage system 100. Aborting pending transactions prevents corrupted data from being written and provides strong consistency within storage system 100.

4. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates computer system 700 upon which one or more embodiments may be implemented. Computer system 700 includes bus 702 or other communication mechanism for communicating information, and hardware processor 704 coupled with bus 702 for processing information. Hardware processor 704 may be, for example, a general purpose microprocessor.

Computer system 700 also includes main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes read only memory (ROM) 708 or other static storage device coupled to bus 702 for storing static information and instructions for processor 704. Storage device 710, such as a magnetic disk or optical disk, is provided and coupled to bus 702 for storing information and instructions.

Computer system 700 may be coupled via bus 702 to display 712, such as a cathode ray tube (CRT), liquid crystal display (LCD), or light-emitting diode (LED), for displaying information to a computer user. Input device 714, which may include physical and/or touchscreen based alphanumeric keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to host computer 724 or to data equipment operated by Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, server 730 might transmit a requested code for an application program through Internet 728, ISP 726, local network 722 and communication interface 718.

The received code may be executed by processor 704 as it is received, and/or stored in storage device 710, or other non-volatile storage for later execution.

5. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause execution of operations comprising:

receiving, by a first tier of a multi-tier storage system from a client, a request to store an object within the multi-tier storage system, the object comprising (a) data and (b) metadata corresponding to the data;

transmitting, by the first tier of the multi-tier storage system, the metadata to a metadata tier of the multi-tier storage system;

receiving, by the first tier of the multi-tier storage system, a first acknowledgement that a metadata record has been created in the metadata tier for storing the metadata corresponding to the data, the metadata record being created with a pending status;

responsive to receiving the first acknowledgement of the metadata record, transmitting, by the first tier of the multi-tier storage system, the data to a data tier of the multi-tier storage system;

receiving, by the first tier of the multi-tier storage system, a second acknowledgement that a data record has been created in the data tier for storing the data, the data record being created with a pending status;

responsive to receiving the second acknowledgement that the data record has been created in the data tier, updating the metadata record to a committed status;

responsive to determining that the metadata record in the metadata tier has the committed status, updating the data record in the data tier to the committed status;

wherein, to enforce strong consistency, a transaction for storing the object is not committed until at least the metadata record has been updated to the committed status.

2. The one or more non-transitory computer-readable media of claim 1, wherein the second acknowledgement comprises location information for the data in the data tier, the operations further comprising responsive to receiving the second acknowledgement that the data record has been created in the data tier: transmitting the location information, for the data, to the metadata tier for updating the metadata record.

3. The one or more non-transitory computer-readable media of claim 1, the operations further comprising responsive to updating the metadata record to a committed status, returning a third acknowledgment to the client that the object has been committed.

4. The one or more non-transitory computer-readable media of claim 3, wherein updating the data record in the data tier is performed by a background process after the third acknowledgment has been returned to the client.

5. The one or more non-transitory computer-readable media of claim 1, the operations further comprising identifying a particular data record in the data tier that has a pending status; responsive to identifying the particular data record in the data tier that has a pending status, determining a status of a corresponding metadata record in the metadata tier; and responsive to determining that the status of the corresponding metadata record in the metadata tier is committed, updating the particular data record in the data tier to a committed status.

6. The one or more non-transitory computer-readable media of claim 1, the operations further comprising identifying a particular data record in the data tier that has a pending status; responsive to identifying the particular data record in the data tier that has a pending status, determining a status of a corresponding metadata record in the metadata tier; and responsive to determining that the status of the corresponding metadata record in the metadata tier is pending, determining whether a threshold period of time has lapsed; responsive to determining that the threshold period of time has lapsed, updating the metadata record to an aborted status; and after updating the metadata record to an aborted status, purging the data record from the data tier.

7. The one or more non-transitory computer-readable media of claim 1, wherein the request is a first request, the operations further comprising: receiving a second request to store a different version of the object within the storage system; responsive to the second request, generating a second metadata record in a pending status; wherein the first request is received after the second request and while the second metadata record is in a pending status; responsive to receiving the first request: aborting a transaction for completing the second request; and deleting the second metadata record from the metadata tier.

8. The one or more non-transitory computer-readable media of claim 7, the operations further comprising deleting a data record in pending status from the data tier responsive to receiving the first request.

9. The one or more non-transitory computer-readable media of claim 1, wherein the metadata record is a version-specific metadata record for the object; wherein the metadata tier includes at least one additional version-specific metadata record for previous versions of the object.

10. The one or more non-transitory computer-readable media of claim 1, the operations further comprising responsive to updating the metadata record to a committed status, updating a status of a second metadata record for a previously active version of the object to an inactive status.

11. The one or more non-transitory computer-readable media of claim 1, the operations further comprising receiving a second request to read the object before the metadata record has been updated to a committed status; responsive to receiving the second request, determining that the metadata record is in a pending status; and responsive to determining that the metadata record is in a pending status, fetching a previously committed version of the object that has an active status.

12. The one or more non-transitory computer-readable media of claim 1, the operations further comprising receiving a second request to read the object before the data record has been updated to the committed status and after the metadata record has been updated to the committed status; responsive to receiving the second request, determining that the data record is in a pending status; and responsive to determining that the data record is in a pending status, determining that the metadata record is in a committed status; and responsive to determining that the metadata record is in a committed status, fetching a version of the object stored in the data record.

13. The one or more non-transitory computer-readable media of claim 12, wherein the data record is updated to the committed status as part of a read transaction for processing the second request.

14. The one or more non-transitory computer-readable media of claim 1, the operations further comprising receiving a second request to delete the object while a transaction modifying the object is in a pending status; responsive to the second request to delete the object, aborting the transaction modifying the object.

15. The one or more non-transitory computer-readable media of claim 1, the operations further comprising responsive to receiving a second write request that includes an updated version of the object; responsive to the second write request, generating a second data record and a second data record for the object; and maintaining the object record and the metadata record for the object in an inactive status until a lifecycle retention policy is satisfied.

16. The one or more non-transitory computer-readable media of claim 1, wherein the data record is replicated across a plurality of storage locations in the data tier.

17. The one or more non-transitory computer-readable media of claim 1, wherein the operations further prevent the client from accessing data that is in a pending state.

18. The one or more non-transitory computer-readable media of claim 1, wherein the second acknowledgement comprises location information for a specific version of the object in the data tier, the operations further comprising responsive to receiving the second acknowledgement that the data record has been created in the data tier: transmitting the location information, for the data, to the metadata tier for updating the metadata record, wherein the metadata record is a version-specific metadata record for the object; wherein, responsive to receiving the location information, the metadata tier adds the location information for the specific version of the object to the version-specific metadata record, updates the metadata record to an active status, and updates a second metadata record for a previous version of the object to an inactive status; and periodically auditing data records within the data tier to determine whether to purge or commit data records having a pending status; wherein a respective data record is committed if a corresponding metadata record in the metadata tier has a committed status.

19. A method comprising:
receiving, by a first tier of a multi-tier storage system from a client, a request to store an object within the multi-tier storage system, the object comprising (a) data and (b) metadata corresponding to the data;
transmitting, by the first tier of the multi-tier storage system, the metadata to a metadata tier of the multi-tier storage system;
receiving, by the first tier of the multi-tier storage system, a first acknowledgement that a metadata record has been created in the metadata tier for storing the metadata corresponding to the data, the metadata record being created with a pending status;
responsive to receiving the first acknowledgement of the metadata record, transmitting, by the first tier of the multi-tier storage system, the data to a data tier of the multi-tier storage system;
receiving, by the first tier of the multi-tier storage system, a second acknowledgement that a data record has been created in the data tier for storing the data, the data record being created with a pending status;
responsive to receiving the second acknowledgement that the data record has been created in the data tier, updating the metadata record to a committed status;
responsive to determining that the metadata record in the metadata tier has the committed status, updating the data record in the data tier to the committed status;
wherein, to enforce strong consistency, a transaction for storing the object is not committed until at least the metadata record has been updated to the committed status.

20. A system comprising:
one or more hardware processors;
one or more non-transitory computer-readable media storing instructions which, when executed by the one or more hardware processors, cause execution of operations comprising:
receiving, by a first tier of a multi-tier storage system from a client, a request to store an object within the multi-tier storage system, the object comprising (a) data and (b) metadata corresponding to the data;

transmitting, by the first tier of the multi-tier storage system, the metadata to a metadata tier of the multi-tier storage system;

receiving, by the first tier of the multi-tier storage system, a first acknowledgement that a metadata record has been created in the metadata tier for storing the metadata corresponding to the data, the metadata record being created with a pending status;

responsive to receiving the first acknowledgement of the metadata record, transmitting, by the first tier of the multi-tier storage system, the data to a data tier of the multi-tier storage system;

receiving, by the first tier of the multi-tier storage system, a second acknowledgement that a data record has been created in the data tier for storing the data, the data record being created with a pending status;

responsive to receiving the second acknowledgement that the data record has been created in the data tier, updating the metadata record to a committed status;

responsive to determining that the metadata record in the metadata tier has the committed status, updating the data record in the data tier to the committed status;

wherein, to enforce strong consistency, a transaction for storing the object is not committed until at least the metadata record has been updated to the committed status.

\* \* \* \* \*